United States Patent
Wang et al.

(10) Patent No.: US 11,474,905 B2
(45) Date of Patent: Oct. 18, 2022

(54) IDENTIFYING HARMFUL CONTAINERS

(71) Applicant: International Business Machines Corporation, Armonk, NY (US)

(72) Inventors: Chen Wang, Chappaqua, NY (US); Ali Kanso, Stamford, CT (US); Alaa S. Youssef, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 49 days.

(21) Appl. No.: 17/117,183

(22) Filed: Dec. 10, 2020

(65) Prior Publication Data
US 2022/0188192 A1   Jun. 16, 2022

(51) Int. Cl.
G06F 11/00 (2006.01)
G06F 11/14 (2006.01)
G06F 9/455 (2018.01)
G06F 21/56 (2013.01)

(52) U.S. Cl.
CPC ...... *G06F 11/1438* (2013.01); *G06F 9/45558* (2013.01); *G06F 21/566* (2013.01); *G06F 2009/45575* (2013.01); *G06F 2201/85* (2013.01); *G06F 2221/033* (2013.01)

(58) Field of Classification Search
CPC ........... G06F 11/1438; G06F 9/45558; G06F 21/566; G06F 2009/45575; G06F 2201/85; G06F 2221/033
USPC ...................................................... 714/1–57
See application file for complete search history.

(56) References Cited

U.S. PATENT DOCUMENTS

| | | | |
|---|---|---|---|
| 6,978,302 B1 | 12/2005 | Chisholm | |
| 9,053,000 B1 | 6/2015 | Lam | |
| 9,117,081 B2 | 8/2015 | Lukacs | |
| 10,585,745 B2 | 3/2020 | Takahashi | |
| 2012/0005534 A1* | 1/2012 | Li | G06F 11/008 714/E11.02 |
| 2014/0149783 A1* | 5/2014 | Georgiev | G06F 11/2028 714/4.2 |

(Continued)

FOREIGN PATENT DOCUMENTS

| | | |
|---|---|---|
| CN | 107589972 A | 1/2018 |
| CN | 109960585 A | 7/2019 |
| CN | 110704165 A | 1/2020 |

OTHER PUBLICATIONS

Julisch, Klaus, "Clustering Intrusion Detection Alarms to Support Root Cause Analysis", ACM Transactions on Information and System Security, vol. 6, No. 4, Nov. 2003, pp. 443-471.

(Continued)

*Primary Examiner* — Sarai E Butler
(74) *Attorney, Agent, or Firm* — Erika R. DeCosty

(57) ABSTRACT

Methods, computer program products, and/or systems are provided that perform the following operations: obtaining data indicative of a node failure; obtaining data associated with nodes and pods started on each node; generating a causation score for each pod associated with a failed node, wherein each pod associated with the failed node is designated as a candidate pod for the node failure; determining pod rescheduling for each candidate pod associated with the failed node based, at least in part, on a pod ranking of the causation score for each pod; and providing the pod rescheduling to a node cluster to restart each pod associated with the failed node.

17 Claims, 9 Drawing Sheets

(56) References Cited

U.S. PATENT DOCUMENTS

| | | | |
|---|---|---|---|
| 2015/0046298 A1* | 2/2015 | Zwakhals | G06Q 10/087 |
| | | | 705/28 |
| 2017/0068581 A1* | 3/2017 | Qi | G06F 11/0709 |
| 2018/0260574 A1 | 9/2018 | Morello | |
| 2019/0179720 A1* | 6/2019 | Chen | G06F 9/455 |
| 2020/0034254 A1 | 1/2020 | Natanzon | |
| 2021/0064442 A1* | 3/2021 | Alluboyina | G06F 9/5011 |
| 2021/0109822 A1* | 4/2021 | Al-Alem | G06F 16/215 |
| 2021/0328858 A1* | 10/2021 | Asveren | H04L 61/2007 |

OTHER PUBLICATIONS

Kobayashi et al., "Mining Causality of Network Events in Log Data", IEEE Transactions On Network and Service Management, vol. 15, No. 1, Mar. 2018, pp. 53-67.

Kobayashi et al., "Mining causes of network events in log data with causal inference", 2017 IFIP/IEEE International Symposium on Integrated Network Management (IM2017), pp. 45-53.

Kushnir et al., "Causality Inference for Failures in NFV", 2016 IEEE Conference on Computer Communications Workshops (INFOCOM WKSHPS): SWFAN 16: International Workshop on Software-Driven Flexible and Agile Networking, 6 pages.

Mell et al., "The NIST Definition of Cloud Computing", Recommendations of the National Institute of Standards and Technology, Special Publication 800-145, Sep. 2011, 7 pages.

Nichols, Shaun, "Malware? In my Docker container? It's more common than you think", The Register, Fri Jul. 28, 2017, 4 pages.

Pannu et al., "AAD: Adaptive Anomaly Detection System for Cloud Computing Infrastructures", 2012 31st International Symposium on Reliable Distributed Systems, 2 pages.

Vallis et al., "A Novel Technique for Long-Term Anomaly Detection in the Cloud", HotCloud '14, 6th Usenix Workshop on Hot Topics in Cloud Computing, Jun. 17-18, 2014, Philadelphia, PA, 7 pages.

Vaughan-Nichols, Steven J., "Doomsday Docker security hole uncovered", ZDNet, Feb. 11, 2019, 4 pages.

Wood et al., "PipeCloud: Using Causality to Overcome Speed-of-Light Delays in Cloud-Based Disaster Recovery", SOCC'11, Oct. 27-28, 2011, Cascais, Portugal, 13 pages.

Yin et al., "Causal Inference Based on the Analysis of Events of Relations for Non-stationary Variables", Scientific Reports 6:29192, Published: Jul. 8, 2016, DOI: 10.1038/srep29192, 7 pages.

\* cited by examiner

IDENTIFYING HARMFUL CONTAINERS

BACKGROUND

The present invention relates generally to the field of cloud applications management, and more particularly, to providing for identifying application containers that may be harmful and/or malicious.

In general, cloud-native applications can be packaged in containers and managed by a container clustering and orchestration middleware such as, for example, Kubernetes. In Kubernetes, a pod can be a group of containers that share the same lifecycle. A pod can be scheduled on a given cluster node according to certain criteria. Such criteria can include, for example, resource availability, load distribution, high availability, and/or the like. A harmful pod can cause a node failure, such as, for example, a malicious container attacking a host system, exhausting resources in the host system, or the like, thereby bringing down the host system. As one example, a malicious privileged container may create a fork-bomb resulting in a node failure. Sometimes a node failure may be so abrupt that there may be no log trace of what caused the node failure. In such a situation, because both the pod (e.g., the container(s)) is gone and the node has failed, there may be little information left on what caused the node failure. In fact, it may appear that the pod failed because the node itself failed and not the other way around. The causality analysis may be non-obvious in such cases.

In general, a pod may be rescheduled on a node in the cluster (e.g., by the middleware, etc.), for example, if it is created via long-running resources (e.g., ReplicaSet, deployment, etc.). Rescheduling a harmful pod may cause cascading failure and could eventually tear down the whole cluster in some cases. Additionally, rescheduling a harmful pod on a node can interrupt all other services collocated with the harmful pod.

SUMMARY

According to aspects of the present disclosure, a method is provided that performs the following operations (not necessarily in the following order): obtaining data indicative of a node failure; obtaining data associated with nodes and pods started on each node; generating a causation score for each pod associated with a failed node, where each pod associated with the failed node is designated as a candidate pod for the node failure; determining pod rescheduling for each candidate pod associated with the failed node based, at least in part, on a pod ranking of the causation score for each pod; and providing the pod rescheduling to a node cluster to restart each pod associated with the failed node. Additional embodiments of the present disclosure provide a computer program product and/or a system that includes program instructions programmed to perform the method's operations.

In some embodiments, the method, computer program product, and/or a system can further include operations of identifying nodes for rescheduling of each candidate pod based on a policy for spreading the candidate pods among a plurality of available nodes.

In some embodiments, the method, computer program product, and/or a system can further include operations of identifying a pod priority for each pod on each node; and biasing the rescheduling of candidate pods to place the candidate pods on nodes with pods having lower pod priorities.

In some embodiments, the method, computer program product, and/or a system can further include operations of obtaining data indicative of additional node failure, where one of the candidate pods was started on the failed node; determining the causation score for the one of the candidate pods exceeding a defined threshold, where the one of the candidate pods is promoted to a primary candidate pod based on exceeding the defined threshold; generating notification data indicative of the primary candidate pod; and providing the notification data to identify the primary candidate pod for analysis. In some embodiments, the method, computer program product, and/or a system can further include operations of assigning the primary candidate pod to an isolated node.

In some embodiments, the method, computer program product, and/or a system can further include correlating pod scheduling events on a node with failure events for the node as part of generating the causation score for each pod.

DETAILED DESCRIPTION

Figure 1:
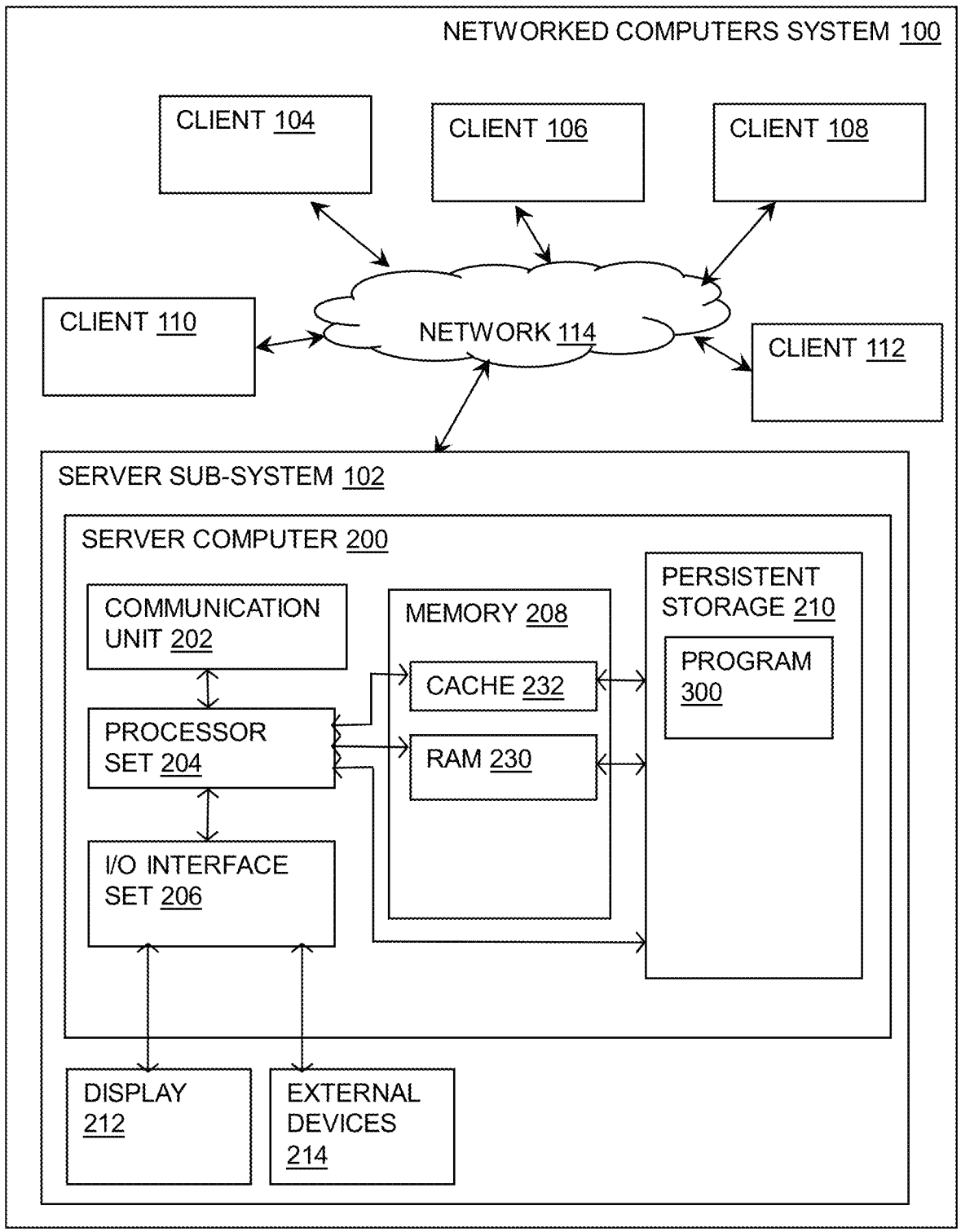
FIG. 1 is a block diagram view of the first embodiment of a system, according to the present invention.

According to aspects of the present disclosure, systems and methods can be provided to identify groups of application containers (e.g., pods) that may be harmful and/or malicious. In particular, systems and methods of the present disclosure can provide for correlating the event of scheduling the pod on the node with the event of node failure. The systems and methods of the present disclosure can provide for generating causation scores for the pods based on the event correlations and statistical analysis. The systems and methods of the present disclosure can provide for rescheduling the pods from the failed node based, at least in part, on the causation scores for each pod. In some embodiments, the systems and methods of the present disclosure can provide for isolating candidate pods, further evaluating candidate pods following additional node failures to identify possible harmful/malicious pods, providing notification of such harmful/malicious pods, and/or stopping further scheduling of such harmful/malicious pods.

Cloud-native applications can typically be packaged in containers and managed by a container clustering and orchestration middleware such as Kubernetes (K8s). In Kubernetes, a pod can be a group of containers that share the same lifecycle. A pod can be scheduled on a given cluster node according to certain criteria. Such criteria can include, for example, resource availability, load distribution, high availability, and/or the like. A harmful pod can cause a node failure, such as, for example, a malicious container attacking a host system, exhausting resources in the host system, or the like, thereby bringing down the host system. As one example, a malicious privileged container may create a fork-bomb resulting in a node failure. Sometimes a node failure may be so abrupt that there may be no log trace of what caused the node failure. In such a situation, because both the pod (e.g., the container(s)) is gone and the node has failed, there may be little information left on what caused the node failure. For example, the pod logs may disappear before they are persisted elsewhere if the node failure is simultaneous with the pod failure. In fact, it may appear that the pod failed because the node itself failed and not the other way around. The causality analysis may be non-obvious in such cases.

In general, a pod may be rescheduled on a node in the cluster (e.g., by the middleware, etc.), for example, if it is created via long-running resources (e.g., ReplicaSet, deployment, etc.). Rescheduling a harmful pod may cause cascading failure and could eventually tear down the whole cluster in some cases. Additionally, rescheduling a harmful pod on a node can interrupt all other services collocated with the harmful pod.

Accordingly, embodiments of the present disclosure can provide for examining the scheduler placement decisions and establishing a correlation between the schedulers log and the node failures. For example, if a node fails shortly after a given pod is scheduled on that node, then the pod can become a candidate pod. If a candidate pod is associated with yet another node failure, it can become a primary candidate pod and so on, until high confidence that the pod is harmful/malicious.

Embodiments of the present disclosure can provide for correlating the event of scheduling the pod on the node with the event of node failure. Two parameters can be essential to determine a confidence interval when identifying a harmful/malicious pod: the number of nodes that have failed after the candidate pod has been scheduled and started on the node, and the amount of time that elapsed between the pod started on the node and the node failure (e.g., the smaller the elapsed time, the higher the confidence level). Statistical hypothesis testing (and/or other statistical methods) can be applied, and the P-value can be evaluated with respect to a predefined desired confidence.

This Detailed Description section is divided into the following sub-sections: The Hardware and Software Environment; Example Embodiments; Further Comments and/or Embodiments; and Definitions.

The Hardware and Software Environment

The present invention may be a system, a method, and/or a computer program product. The computer program product may include a computer-readable storage medium (or media) with computer-readable program instructions for causing a processor to carry out aspects of the present invention.

The computer-readable storage medium can be a tangible device that can retain and store instructions for an instruction execution device. The computer-readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, such as the Internet, a local area network, a wide area network, and/or a wireless network. The system may comprise copper transmission cables, optical transmission fibers, wireless transmission, routers, firewalls, switches, gateway computers, and/or edge servers. A network adapter card or network interface in each computing/processing device receives computer readable program instructions from the network. It forwards the computer-readable program instructions for storage in a computer-readable storage medium within the respective computing/processing device.

The computer-readable program instructions for carrying out operations of the present invention may be assembler instructions, instruction-set-architecture (ISA) instructions, machine instructions, machine-dependent instructions, microcode, firmware instructions, state-setting data, or either source code or object code written in any combination of one or more programming languages, including an object-oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the function/act specified in the flowchart and/or block diagram block or blocks.

The computer-readable program instructions may also be loaded onto a computer, other programmable data processing apparatus, or other devices to cause a series of operational steps to be performed on the computer, other programmable apparatus, or other devices to produce a computer-implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

According to the present invention, an embodiment of a possible hardware and software environment for software and/or methods will now be described in detail with reference to the Figures. FIG. 1 is a functional block diagram illustrating various portions of networked computers system 100, including: server sub-system 102; client sub-systems 104, 106, 108, 110, 112; communication network 114; server computer 200; communication unit 202; processor set 204; input/output (I/O) interface set 206; memory device 208; persistent storage device 210; display device 212; external device set 214; random access memory (RAM) devices 230; cache memory device 232; and program 300.

Sub-system 102 is, in many respects, representative of the various computer sub-system(s) in the present invention. Accordingly, several portions of sub-system 102 will now be discussed in the following paragraphs.

Sub-system 102 may be a laptop computer, tablet computer, netbook computer, personal computer (PC), a desktop computer, a personal digital assistant (PDA), a smartphone, or any programmable electronic device capable of communicating with the client sub-systems via network 114. Program 300 is a collection of machine-readable instructions and/or data that can be used to create, manage, and control certain software functions, such as will be discussed in detail below, in the Example Embodiment sub-section of this Detailed Description section. As an example, a program 300 can comprise detecting/identifying harmful pods, assistance for rescheduling pods/node assignment, harmful pod sandboxing, and/or the like.

Sub-system 102 is capable of communicating with other computer sub-systems via network 114. Network 114 can be, for example, a local area network (LAN), a wide area network (WAN) such as the Internet, or a combination of the two, and can include wired, wireless, or fiber optic connections. In general, network 114 can be any combination of connections and protocols that will support communications between server and client sub-systems.

Sub-system 102 is shown as a block diagram with many double arrows. These double arrows (no separate reference numerals) represent a communications fabric, which provides communications between various components of sub-system 102. This communications fabric can be implemented with any architecture designed for passing data and/or control information between processors (such as microprocessors, communications, and network processors, etc.), system memory, peripheral devices, and any other hardware components within a system. For example, the communications fabric can be implemented, at least in part, with one or more buses.

Memory 208 and persistent storage 210 are computer-readable storage media. In general, memory 208 can include any suitable volatile or non-volatile computer-readable storage media. It is further noted that now and/or in the near future: (i) external device(s) 214 may be able to supply, some or all, memory for sub-system 102; and/or (ii) devices external to sub-system 102 may be able to provide memory for sub-system 102.

Program 300 is stored in persistent storage 210 for access and/or execution by one or more of the respective computer processors 204, usually through one or more memories of memory 208. Persistent storage 210: (i) is at least more persistent than a signal in transit; (ii) stores the program (including its soft logic and/or data) on a tangible medium (such as magnetic or optical domains); and (iii) is substantially less persistent than permanent storage. Alternatively, data storage may be more persistent and/or permanent than the type of storage provided by persistent storage 210.

Program 300 may include both machine-readable and performable instructions and/or substantive data (that is, the type of data stored in a database). For example, program 300 may include machine-readable and performable instructions to provide for the performance of method operations as disclosed herein. In this particular embodiment, persistent storage 210 includes a magnetic hard disk drive. To name some possible variations, persistent storage 210 may include a solid-state hard drive, a semiconductor storage device, read-only memory (ROM), erasable programmable read-only memory (EPROM), flash memory, or any other computer-readable storage media that is capable of storing program instructions or digital information.

The media used by persistent storage 210 may also be removable. For example, a removable hard drive may be used for persistent storage 210. Other examples include optical and magnetic disks, thumb drives, and smart cards that are inserted into a drive for transfer onto another computer-readable storage medium that is also part of persistent storage 210.

Communications unit 202, in these examples, provides for communications with other data processing systems or devices external to sub-system 102. In these examples, communications unit 202 includes one or more network interface cards. Communications unit 202 may provide communications through the use of either or both physical and wireless communications links. Any software modules discussed herein may be downloaded to a persistent storage device (such as persistent storage device 210) through a communications unit (such as communications unit 202).

I/O interface set 206 allows for input and output of data with other devices that may be connected locally in data communication with server computer 200. For example, I/O interface set 206 provides a connection to the external device set 214. External device set 214 will typically include devices such as a keyboard, keypad, a touch screen, and/or some other suitable input device. External device set 214 can also include portable computer-readable storage media such as, for example, thumb drives, portable optical or magnetic disks, and memory cards. Software and data used to practice embodiments of the present invention, for example, program 300, can be stored on such portable computer-readable storage media. In these embodiments, the relevant software may (or may not) be loaded, in whole or in part, onto persistent storage device 210 via I/O interface set 206. I/O interface set 206 also connects in data communication with display device 212.

Display device 212 provides a mechanism to display data to a user and may be, for example, a computer monitor, a smartphone/tablet display screen, and/or the like.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Example Embodiments

Figure 2:
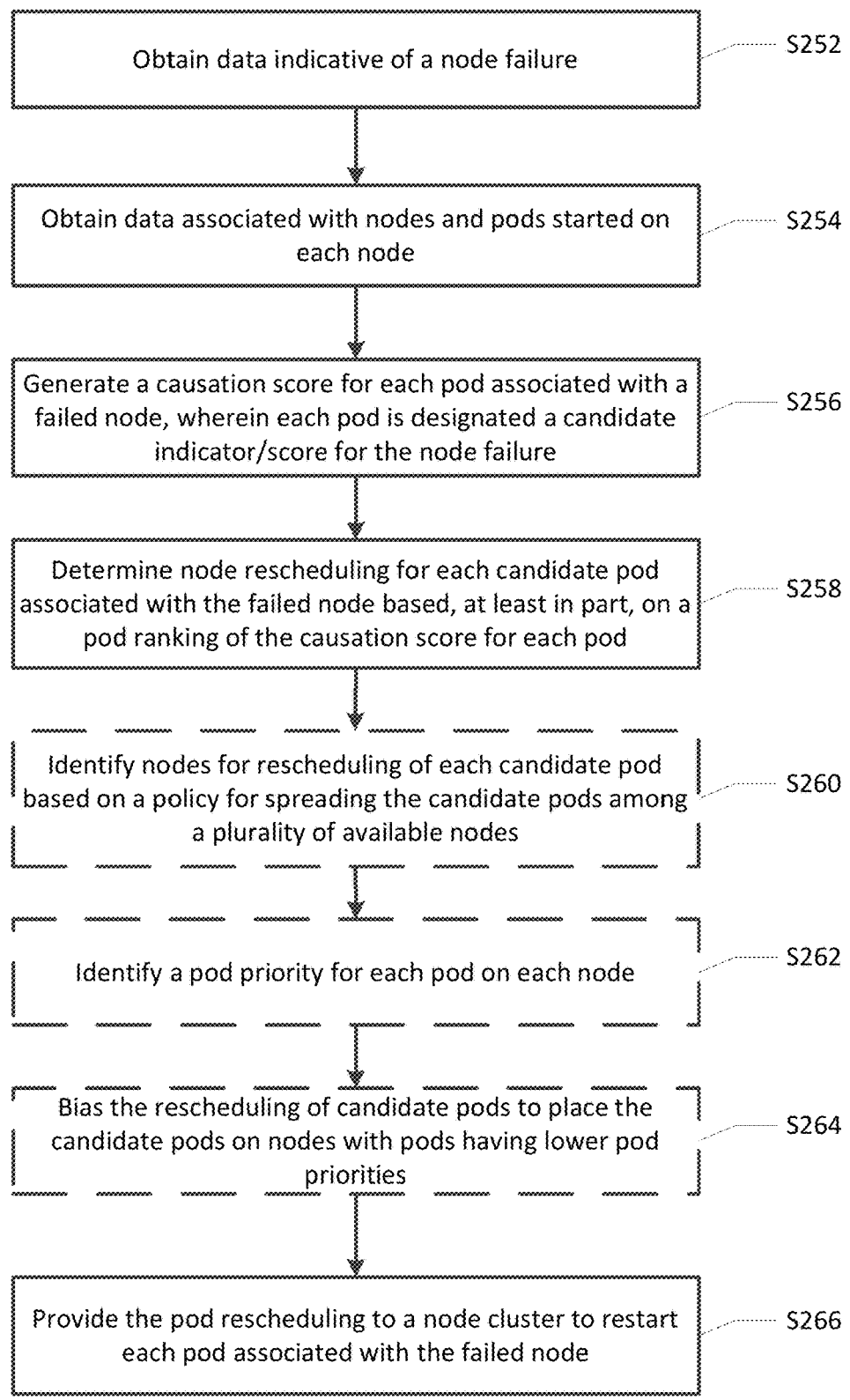
FIG. 2 is a flowchart showing a first embodiment method performed, at least in part, by the first embodiment system.
Figure 3:
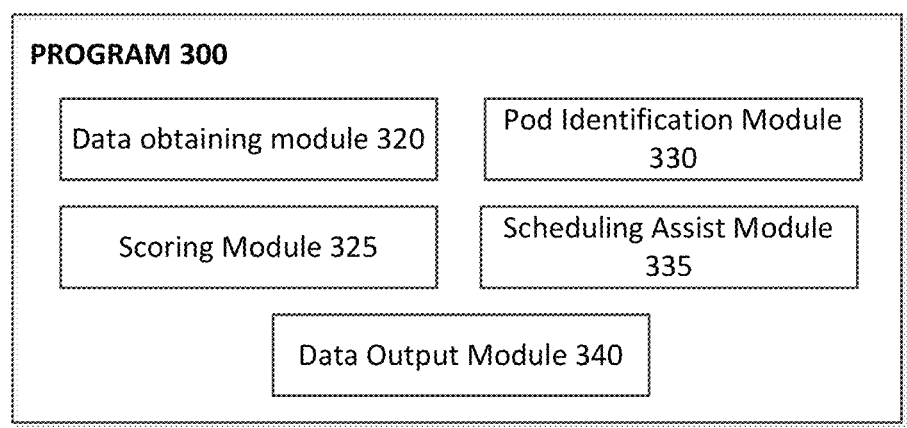
FIG. 3 is a block diagram showing an example machine logic (for example, software) portion of the first embodiment system.

FIG. 2 shows flowchart 250 depicting a computer-implemented method, according to embodiments of the present invention. FIG. 3 shows a program 300 for performing at least some of the method operations of flowchart 250. Regarding FIG. 2, one or more flowchart blocks may be identified with dashed lines and represent optional steps that may additionally be included but which are not necessarily required in the depicted embodiments. This method and associated software will now be discussed, over the course of the following paragraphs, with extensive reference to FIG. 2 (for the method operation blocks) and FIG. 3 (for the software blocks).

As illustrated in FIG. 2, in some embodiments, operations for identifying and/or determining candidate pods for a node failure (e.g., harmful pods) begin at operation S252, where a computing system (e.g., server computer 200 of FIG. 1 or the like) obtains data indicating a node failure. As an example, a data obtaining module 320 of FIG. 3 and/or the like can obtain data indicating one or more nodes in a cluster have failed. Cloud-native applications can be packaged in containers, which can be deployed on nodes of a cluster. A pod is a group of containers that are managed as a group to share the same lifecycle. In some cases, a node failure can be caused by a harmful/malicious pod, for example, by exhausting a host's resources, attacking a host, and/or the like. When a node fails, one or more pods started on the node (e.g., candidate pods) can be identified to determine if they contributed to and/or caused the node's failure.

Processing proceeds to operation S254, where the computing system (e.g., server computer 200 of FIG. 1 or the like) can obtain data associated with and/or indicative of the nodes within a cluster and the pods that have been scheduled and/or started on each node. As an example, a data obtaining module 320 and/or the like can obtain data associated with each node in a cluster and the pods that have been scheduled and/or started on each node. Additionally, the data obtained by the data obtaining module 320 and/or the like can be indicative of all of the pods that have been scheduled and/or started on a node within the cluster that has failed. In some embodiments, the pods scheduled and/or started on a failed node can be identified for rescheduling on another node within the cluster.

Processing proceeds to operation S256, where the computing system (e.g., server computer 200 of FIG. 1 or the like) can generate a causation score for each pod associated with a failed node. The computing system (e.g., server computer 200 of FIG. 1 or the like) can designate and/or otherwise identify the one or more pods scheduled and/or started on the failed node as candidate pods. As an example, a scoring module 325 of FIG. 3 and/or the like can generate a causation score for each candidate pod associated with a failed node. Additionally, a pod identification module 330 of FIG. 3 and/or the like can allow for designating and/or otherwise identifying candidate pods, based at least in part, on a node failure and a causation score for each pod started on the failed node. For example, in some embodiments, after a node failure, a scheduler log can be analyzed to identify one or more candidate pods (e.g., pods scheduled on the node prior to the failure).

In some embodiments, the scoring module 325 and/or the like can provide for correlating pod scheduling events on a node with failure events for a node and subsequently generate the causation score for each candidate pod-based, at least in part, on such event correlations. For example, in some embodiments, the computing system can provide for examining the scheduling events and the node failure events and determining event causalities using hypothesis testing and/or other statistical methods on event relations. In some embodiments, the harmfulness of a pod can be evaluated via causality analysis of events, and a causality testing probability can be modeled to use as a causation score and/or causation indicator for a pod. In some embodiments, parameters that can be used to determine a confidence interval in identifying harmful and/or malicious pods can include: (1) the number of nodes that have failed after a candidate pod has been scheduled and started on the node; and (2) the amount of time that elapsed between the pod starting on the node and the node failure. In such embodiments, a shorter elapsed time can lead to a higher confidence level that the candidate pod is harmful/malicious and contributed to and/or caused a node failure.

In some embodiments, harmful/malicious pod identification can be implemented using statistical hypothesis testing (and/or other statistical methods), where the P-value with respect to a predefined desired confidence (e.g., 95%, etc.) can be evaluated. In some embodiments, candidate pods may be ranked according to the statistical confidence value (e.g., causation score, causation indicator, etc.) associated with each candidate pod.

In some embodiments, a causation score (e.g., causation indicator) for a pod can be computed using event relation random variables, for example, $M_\tau$ and $K_\tau$, as follows. For a pod type Y, count its latest scheduling events to node x, as Y=1 before node x fails. For a node x, count its failure event X=1 for up to n observations among all nodes. Construct the event relation variable $M_\tau$, denoting an event that Y=1 happened $\tau \cdot t_0$ before X=1. If Y does not cause X, there is $p(M_0)=p(M_\tau)$. When the number of observations n is sufficiently large:

$M_0$ occurs $K_0$, calculate $K_0=\text{sum}\{x=1|Y=1\}$ when both X and Y happened within the same time slot.

$M_\tau$ occurs $K_\tau$, calculate $K_\tau=\text{sum}\{x=1|Y=1\}$ when Y happened within $\tau$ time slots before X.

$M_0$ and $M_\tau$ should be in the same distribution and $K_0$ and $K_\tau$ are following the binomial distribution when X and Y are Poisson processes.

Use Poisson distribution for hypothesis testing of variable $K_0=K_\tau$

A Poisson cumulative distribution function of event relation variable can be computed as:

$$p_\tau = F(x | K_0) = e^{-k_0} \sum_{i=0}^{floor(x)} \frac{K_0^i}{i!}.$$

The confidence can be used to determine the causality as the indicator of causation (e.g., causation score) for a candidate pod. If $p_\tau=F(K_\tau|K_0)>1-\alpha$, which indicates that $K_\tau$ is significantly larger than $K_0$; then Y has positive causality with X after delay $\tau$. This can indicate that pod Y caused X failure with a confidence of $1-\alpha$. If $p_\tau=F(K_\tau|K_0)<\alpha$, which indicates that $K_\tau$ is significantly smaller than $K_0$; then Y has negative causality with X after delay $\tau$. This can indicate that the chance of pod Y causing X failure, with delay $\tau$, is much smaller than the chance of pod Y starting and X failure occurring around the same time, and as such, this case can be ignored. If $\alpha<F(K_\tau|K_0)<1-\alpha$, this can indicate that the causation of pod Y is being guessed without enough confidence. The causation score for pod Y can be indicated by $$\max_\tau p_\tau.$$

Processing proceeds to operation S258, where the computing system (e.g., server computer 200 of FIG. 1 or the like) can determine pod rescheduling for each candidate pod associated with the failed node (e.g., adjusting the scheduled node of each candidate pod) based, at least in part, on a pod ranking of the causation score for each pod. In some embodiments, candidate pods may be ranked according to the statistical confidence value (e.g., causation score, etc.) associated with each candidate pod. As an example, a scheduling assist module 335 and/or the like can reschedule each pod started on a failed node (e.g., each candidate pod) to be started on another node within the cluster. The scheduling assist module 335 and/or the like can determine which pods to schedule on which nodes based, at least in part, on ranking the candidate pods by their corresponding causation score.

Optionally, in some embodiments, processing may continue to operation S260, where the computing system (e.g., server computer 200 of FIG. 1 or the like) can use one or more policies for spreading the candidate pods among a plurality of available nodes within the cluster to determine and/or identify which candidate pod should be rescheduled for which node. For example, in some embodiments, the computing system (e.g., scheduler, etc.) can spread the candidate pods over multiple available nodes to maximize the chance of detecting the harmful pods. In some embodiments, the computing system may spread the top K candidate pods (e.g., based on causation score, etc.) across different nodes. Spreading the candidate pods in such a manner may increase the statistical significance of each node failure.

Optionally, in some embodiments, processing may proceed to operation S262, where, before determining which pods to schedule on which nodes, the computing system (e.g., server computer 200 of FIG. 1 or the like) can identify and/or determine a priority for each pod on each node. Optionally, in some embodiments, processing may proceed to operation S264, where the computing system (e.g., server computer 200 of FIG. 1 or the like) can bias the rescheduling of the candidate pods to place candidate pods on nodes with lower priority pods, such that a node failure caused by a candidate pod may only affect lower priority pods already on the node. In some embodiments, the candidate pods having the highest causation scores can be scheduled (e.g., assigned) to available nodes first, based in part on the priority of pods already on the node. For example, in some embodiments, the highest causation score candidate pod can be rescheduled to the node with the lowest priority. In some embodiments, a node priority may be determined based on the highest pod priority of the pods already scheduled on the node. An empty node (e.g., with no pods scheduled/started) can be assigned the lowest priority.

Processing proceeds to operation S266, where the computing system (e.g., server computer 200 of FIG. 1 or the like) can provide the pod rescheduling to a cluster (e.g., node cluster) to reschedule/restart each pod associated with the failed node. For example, a data output module 340 and/or the like can provide pod rescheduling data to assign the candidate pods from the failed node to one or more other available nodes within a cluster. The pods can be restarted on the newly scheduled nodes, and the nodes can be monitored for future node failure. Additional node failures can result in further evaluation of candidate pods to determine harmful/malicious pods.

Further Comments and/or Embodiments

Additionally, some embodiments of the present disclosure can provide for evaluation of candidate pods that were rescheduled on a node that failed after the candidate pod was scheduled on the node. For example, in some embodiments, a computing system (e.g., server computer 200 of FIG. 1 or the like) can obtain data indicating an additional node failure after one or more of the candidate pods where scheduled on a node. As described in FIG. 2, causation scores can be generated for the pods on the additional failed node, including the prior candidate pods scheduled on the failed node. The computing system can determine if the causation score for a candidate pod (e.g., a pod from an earlier failed node, etc.) exceeds a defined threshold, for example, 90% confidence, 95% confidence, etc. If the causation score of a candidate pod exceeds the defined threshold, the candidate pod can be identified as a primary candidate pod (e.g., promoted to a primary candidate pod with regard to the harmfulness of the pod). The computing system can generate and provide notification data regarding the primary candidate pod, for example, to a system administrator, domain expert, and/or the like, such that the primary candidate pod can be further evaluated to determine the harmfulness of the pod (e.g., perform a sanity check on the primary candidate pod, etc.).

In some embodiments, the computing system can bias the rescheduling to only place (e.g., reschedule, etc.) primary candidate pods on isolated nodes (e.g., sandboxed environment nodes, a nested virtual machine, etc.). In some embodiments, a primary candidate node may be rescheduled on an isolated node while awaiting evaluation by a domain expert and/or the like. If the isolated node (e.g., sandboxed environment, etc.) fails after the primary candidate node is scheduled (e.g., as a result of hosting the primary candidate node, etc.), the primary candidate pod can be identified as (e.g., promoted to) a causation pod status. In some embodiments, rescheduling of a primary candidate pod can be stopped if a causation score meets or exceeds a certain threshold, for example, if $p_\tau^A = F(K_\tau^A | K_0) > 1 - \alpha$.

Figure 4A:
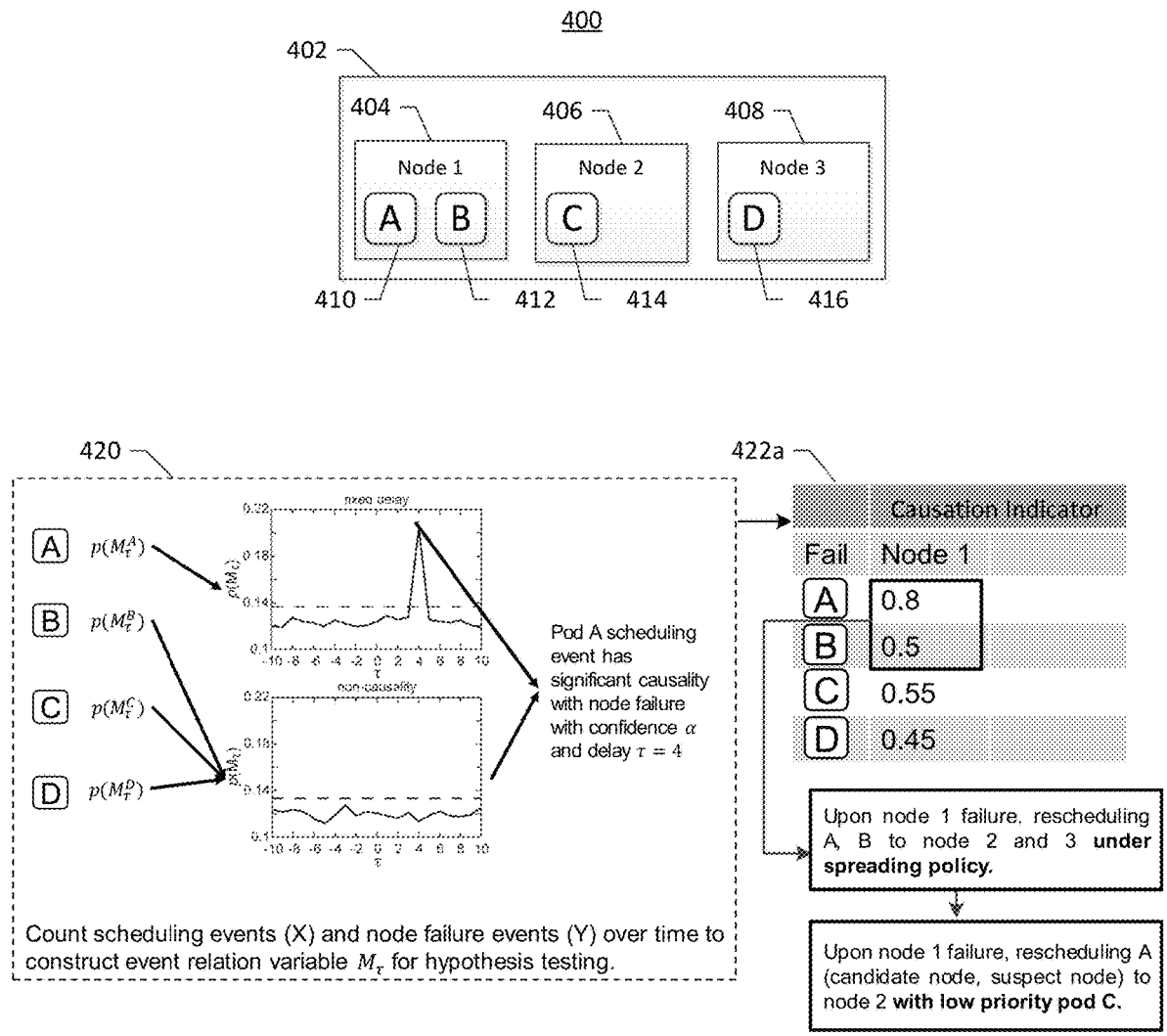
FIGS. 4A and 4B are block diagrams illustrating examples for identifying harmful pods, according to embodiments of the present invention.
Figure 4B:
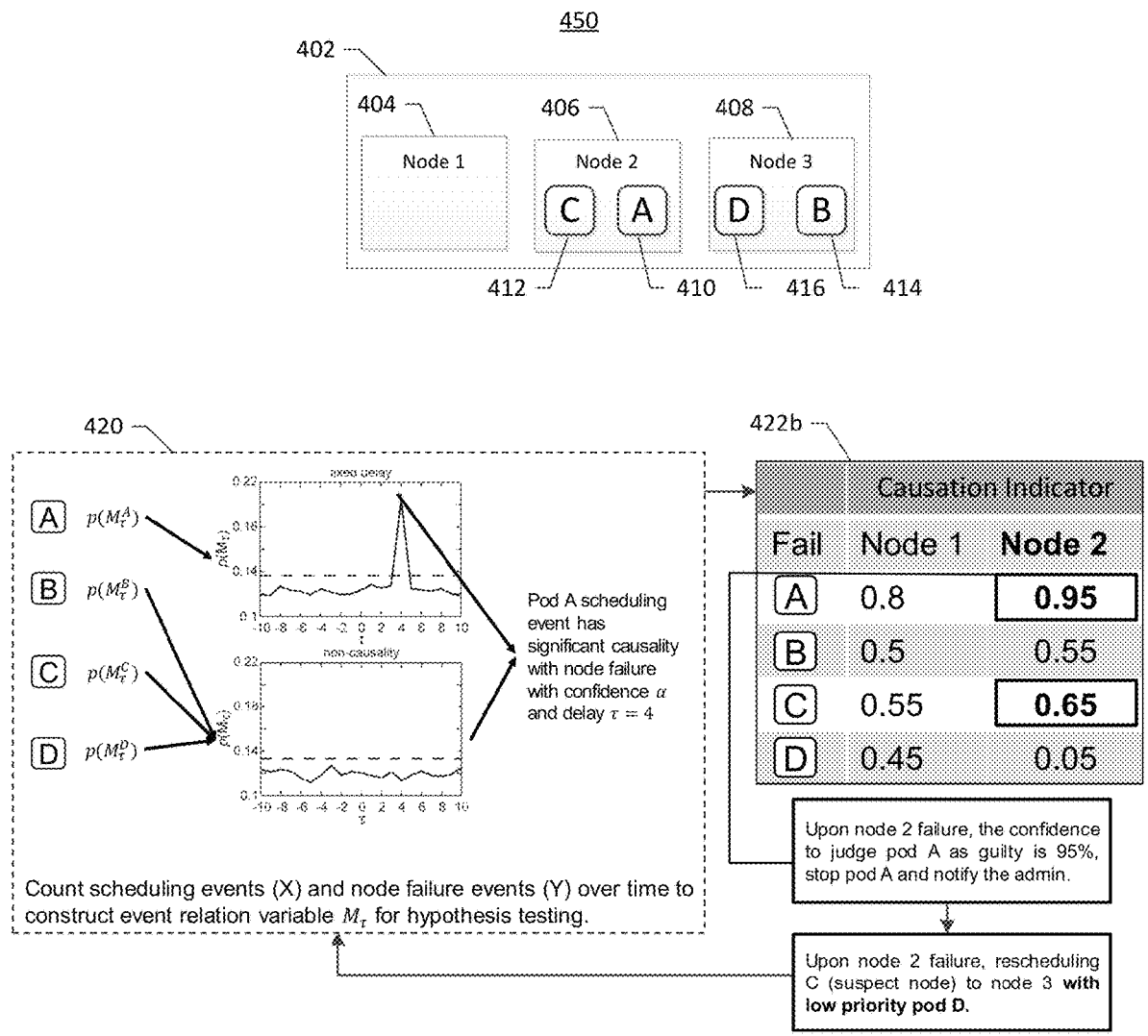

FIGS. 4A and 4B are block diagrams illustrating examples of candidate/harmful pod identification 400 and 450, according to embodiments of the present invention. As illustrated in FIG. 4A, in an example embodiment, candidate/harmful pod identification 400 can be provided for a cluster 402. The cluster 402 can include multiple nodes, such as node-1 404, node-2 406, and node-3 408. As described above, one or more pods (e.g., groups of containers) can be scheduled on one or more nodes in the cluster. For example, as illustrated, pod-A 410 and pod-B 412 can be scheduled on node-1 404, pod-C 414 can be scheduled on node-2 406, and pod-D 416 can be scheduled on node-3 408. Evaluation of pods (e.g., to determine harmfulness, etc.) can be provided by correlating scheduling events and node failure events over time to construct event relation variables for statistical testing, as illustrated in analysis 420. The correlation of scheduling events and failure events and statistical testing can allow for generation of causation indicators (e.g., causation score, etc.) for each pod, as shown in indicator of causation table 422a. One or more pods scheduled on a failed node can be evaluated to identify candidate pods that contributed to and/or caused a node failure. For example, some elapsed time after pod-A 410 and pod-B 412 are scheduled/started on node-1 404, node-1 404 may fail. After the failure of node-1 404, causation scores can be generated for the pods as shown in indicator of causation table 422a. In some embodiments, the pods that were scheduled/started on a failed node can be rescheduled to other available pods and may be spread across multiple nodes to improve harmful pod detection. For example, after node-1 404 failed, pod-A 410 and pod-B 412 can be rescheduled to node-2 406 and node-3 408. In some embodiments, pods on a filed nod can be identified as candidate pods, for example, based on a causation score. The candidate pods can be scheduled to nodes having lower priorities (e.g., hosting low priority pods). For example, pod-C 414 may be the lowest priority pod, so candidate pod, pod-A 410, may be scheduled to node-2 406. The pods can be restarted on the newly scheduled nodes, and the nodes can be monitored for future node failure, such as illustrated in FIG. 4B.

As illustrated in FIG. 4B, in an example embodiment, continued candidate/harmful pod identification can be further provided for a cluster 402 in candidate/harmful pod identification 450. Pod-A 410 may be scheduled to node-2 406 along with pod-C 412, and pod-B 414 may be scheduled to node-3 408 along with pod-D 416. Again, evaluation of pods can be provided by correlating scheduling events and node failure events over time to construct event relation variables for statistical testing, as illustrated in analysis 420. For example, some elapsed time after pod-A 410 and pod-B 412 are rescheduled to node-2 406 and node-3 408, respectively, node-2 406 may fail. After the failure of node-2 406, causation scores can be generated for the pods as shown in indicator of causation table 422b. The pods that were scheduled/started on the failed node can be rescheduled to other available pods and may be spread across multiple nodes to improve harmful pod detection. As shown in FIG. 4B, pod-C 412 can be identified as a candidate pod in node-2 failure and can be rescheduled to the available node, node-3 408.

In some embodiments, a candidate pod scheduled on a subsequently failed node can be evaluated to determine whether the candidate pod should be promoted to a primary candidate pod status. In some embodiments, once a primary candidate node is identified, a notification may be provided, for example, to a domain expert, administrator, etc.; the primary candidate pod may be sandboxed by scheduling the primary candidate pod on an isolated node; and/or the primary candidate pod may be promoted to a causation pod status and rescheduling for the pod may be stopped. For example, after the failure of node-2 406, the causation score for candidate pod-A 410 may meet or exceed a defined threshold, for example, 95% as shown in table 422b, and be designated as a primary candidate pod or a causation pod. In some embodiments, if the causation score of candidate pod-A 410 meets or exceeds a threshold, such as 95% confidence, pod-A 410 can be killed (e.g., no further rescheduling, etc.), and a notification can be provided, for example, to an administrator, domain expert, and/or the like.

Figure 5:
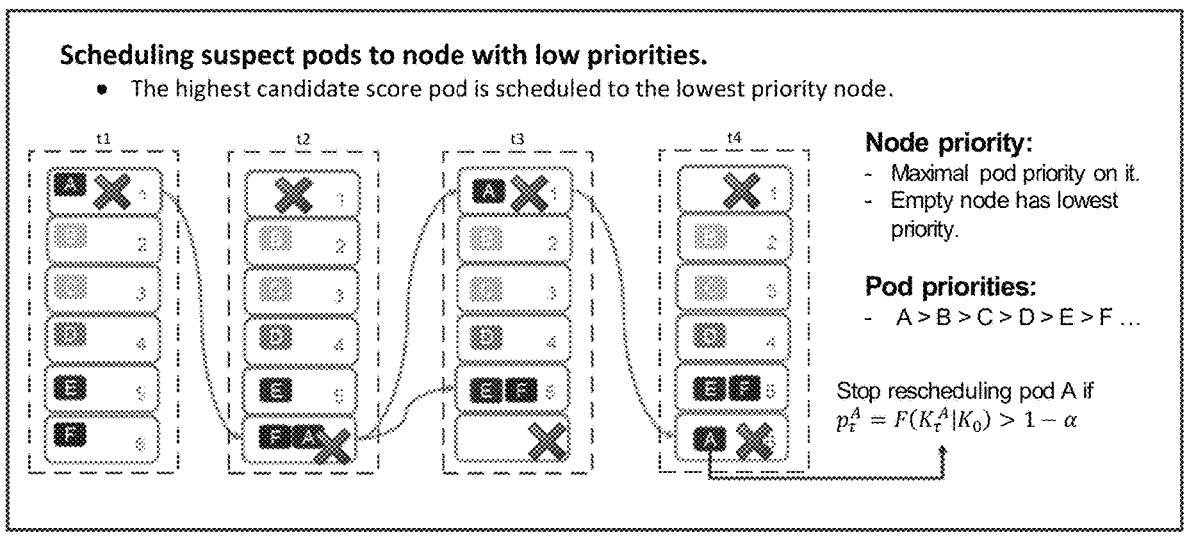
FIG. 5 is a block diagram illustrating scheduling candidate pods to nodes with low priorities, according to embodiments of the present invention.

FIG. 5 is a block diagram illustrating candidate pod scheduling 500 where candidate pods are scheduled to nodes with low priorities, according to embodiments of the present invention. As illustrated in FIG. 5, one or more pods, such as pod A, pod B, pod C, pod D, pod E, and pod F, may be scheduled to one or more nodes of a cluster, such as node 1, node 2, node 3, node 4, node 5, and node 6 respectively. In some embodiments, priorities can be identified for each pod, and a node priority can be based on the highest pod priority on the node and an empty node can be assigned the lowest priority. For example, in candidate pod scheduling 500, the pods can have decreasing priorities, such that the priority of pod A>pod B>pod C>pod D>pod E>pod F. After some elapsed time (e.g., t1), node 1 may fail, and pod A can be rescheduled to the lowest priority node, node 6 with pod F. Because pod A was previously scheduled on node 1 prior to node 1 failure, pod A may be identified as a candidate pod. After some further elapsed time (e.g., at t2), node 6 may fail. In some embodiments, the pods on a failed node may be scheduled across different available nodes to maximize the detection of harmful pods. For example, pod A may be scheduled to the lowest priority node, node 1, which is empty after restarting and pod F may be scheduled to a next higher priority node, node 5 along with pod E. After some further elapsed time (e.g., at t3), node 1 may fail, and pod A may be again rescheduled to the lowest priority node (e.g., empty node), node 6. If node 6 fails some further elapsed time (e.g., t4) after pod A was rescheduled to node 6, it may be determined that pod A is a harmful/malicious pod and the rescheduling of pod A may be stopped and/or an administrator, domain expert, and/or the like may be notified.

Figure 6:
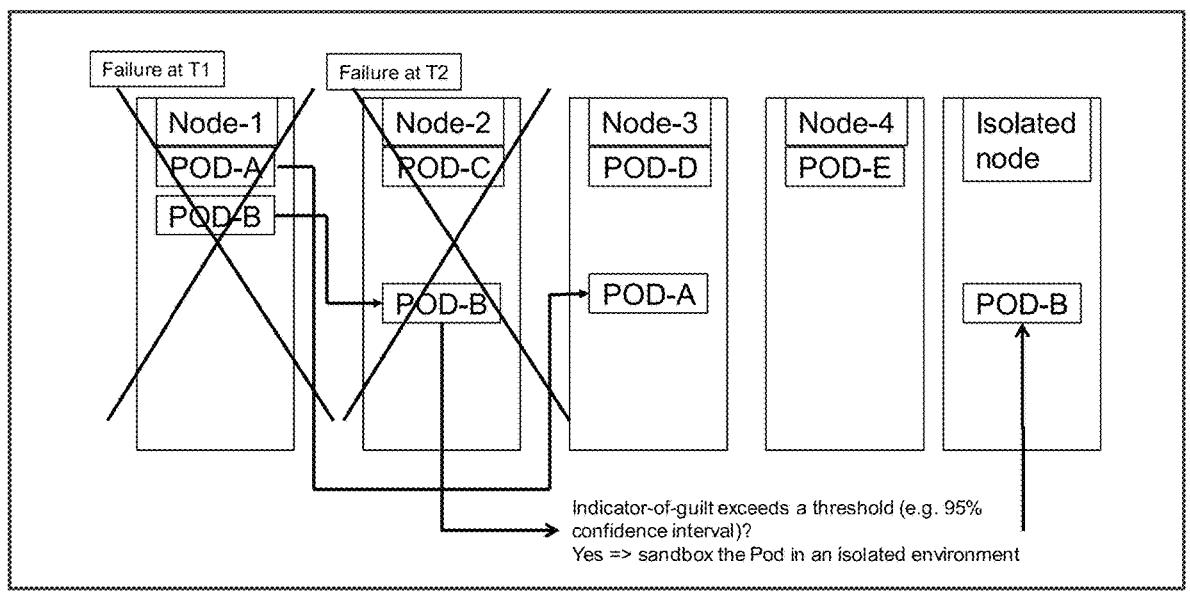
FIG. 6 is a block diagram illustrating scheduling a primary candidate pod on an isolated node, according to embodiments of the present invention.

FIG. 6 is a block diagram illustrating sandboxing 600 of a primary candidate node by scheduling the primary candidate pod on an isolated node, according to embodiments of the present invention. As illustrated in FIG. 6, one or more pods, such as pod A, pod B, pod C, pod D, and pod E may be scheduled to one or more nodes of a cluster, such as node 1, node 2, node 3, and node 4. For example, initially pod A and pod B may be scheduled to node 1, pod C may be scheduled to node 2, pod D may be scheduled to node 3, and pod E may be scheduled to node 4. After some elapsed time, at T1, node 1 may fail and causation scores may be generated for the pods, as described above. Pod A may then be rescheduled to node 3 along with pod D and pod B may be rescheduled to node 2 along with pod C. Some elapsed time after pod B is rescheduled to node 2, at T2, node 2 may fail. After the failure of node 2, the causation score of pod B may meet or exceed some defined threshold, for example, 95% confidence, and pod B may then be identified as a primary candidate pod. Pod B may then be rescheduled to an isolated node (e.g., sandboxed, etc.) awaiting further evaluation, for example, by a domain expert, administrator, etc. Pod B may be sandboxed to prevent any additional node failure associated with pod B from affecting other pods.

Identifying harmful/malicious pods may raise a number of challenges. For example, monitoring node failure events only may not reveal the failure. The heartbeat may not capture the node failure if $T_r < T_{probing}$. The pod may not be rescheduled to the node i when the cluster size is large, thus mean time between failures, $$MTBF > \frac{1}{\lambda_i}.$$

Additionally, monitoring pod scheduling events may lead to wrong actions. For example, pod scheduling events may be determined by two factors, pod arrival rate, and pod failure rate, yet both of these factors may be unknown and non-stationary. Further, when a harmful pod fails the node one by one, failed pods may cumulate over failed nodes, and thus more and more pods will have higher and higher scheduling rates. As such, identifying the true harmful pod(s) may be difficult.

In addition, causality between the scheduling events and the node failure events can be hard to determine. For example, a Granger test requires stationary process for both events and event grouping/clustering usually takes the domain knowledge or time window for grouping, yet the pods to reschedule due to node failures generally include multiple pods intermixed with new arrivals.

Many of these challenges for identifying harmful/malicious pods can be addressed by the various embodiments of the present disclosure.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, services, etc.) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
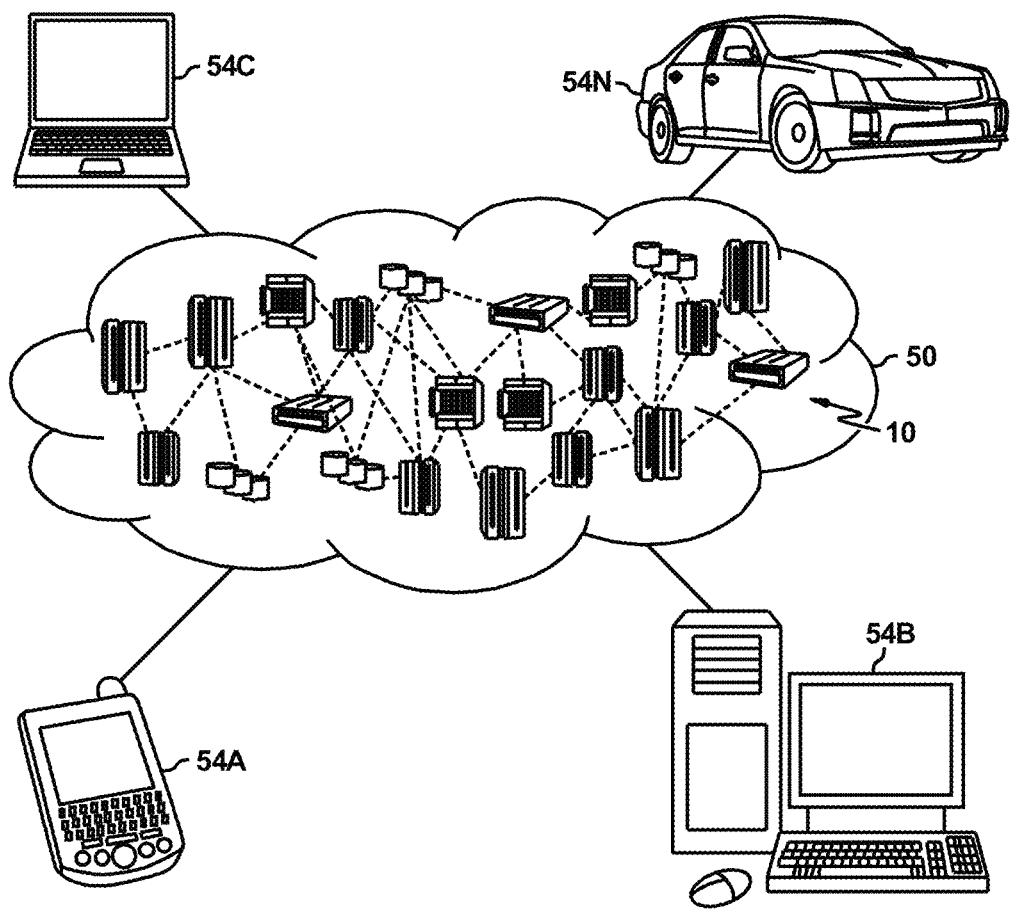
FIG. 7 depicts a cloud computing environment, according to embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
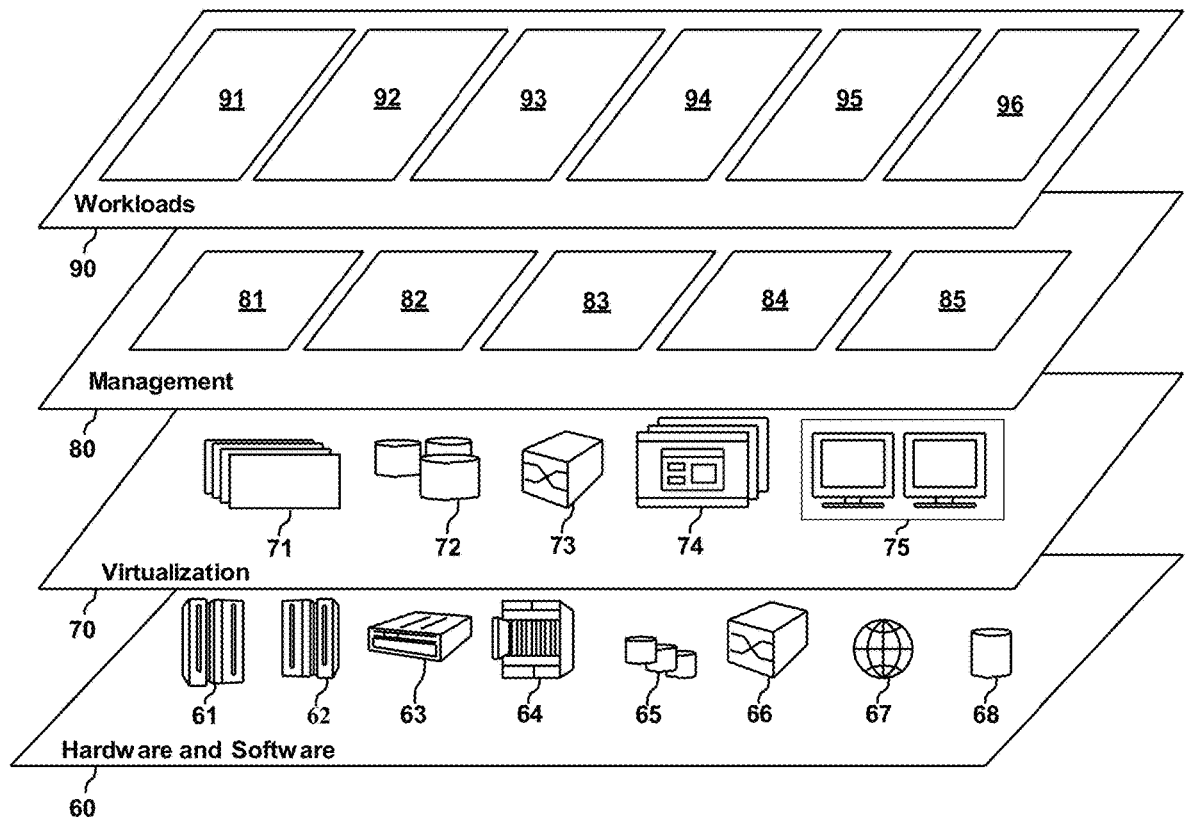
FIG. 8 depicts abstraction model layers, according to embodiments of the present invention.

Referring now to FIG. 8, a set of functional abstraction layers provided by cloud computing environment 50 (of FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

Definitions

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein are believed to potentially be new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

Including/include/includes: unless otherwise explicitly noted, means "including but not necessarily limited to."

Data communication: any sort of data communication scheme now known or to be developed in the future, including wireless communication, wired communication and communication routes that have wireless and wired portions; data communication is not necessarily limited to: (i) direct data communication; (ii) indirect data communication; and/or (iii) data communication where the format, packetization status, medium, encryption status and/or protocol remains constant over the entire course of the data communication.

Receive/provide/send/input/output/report: unless otherwise explicitly specified, these words should not be taken to imply: (i) any particular degree of directness with respect to the relationship between their objects and subjects; and/or (ii) absence of intermediate components, actions and/or things interposed between their objects and subjects.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assis-

What is claimed is:

1. A computer-implemented method comprising: obtaining data indicative of a node failure; obtaining data associated with nodes and pods started on each node; generating a causation score for each pod associated with a failed node, wherein each pod associated with the failed node is designated as a candidate pod for the node failure; determining pod rescheduling for each candidate pod associated with the failed node based, at least in part, on a pod ranking of the causation score for each pod; spreading each candidate pod among a plurality of available nodes for rescheduling based on a policy; and providing the pod rescheduling to a node cluster to restart each pod associated with the failed node.

2. The computer-implemented method of claim 1, further comprising:
identifying a pod priority for each pod on each node; and
biasing rescheduling of candidate pods to place the candidate pods on nodes with pods having lower pod priorities.

3. The computer-implemented method of claim 1, further comprising:
obtaining data indicative of additional node failure, wherein one of the candidate pods was started on the failed node;
determining the causation score for the one of the candidate pods exceeds a defined threshold, wherein the one of the candidate pods is promoted to a primary candidate pod based on exceeding the defined threshold;
generating notification data indicative of the primary candidate pod; and
providing the notification data to identify the primary candidate pod for analysis.

4. The computer-implemented method of claim 3, further comprising assigning the primary candidate pod to an isolated node.

5. The computer-implemented method of claim 3, wherein the notification data indicating the primary candidate pod includes a harmfulness confidence level of the primary candidate pod.

6. The computer-implemented method of claim 1, wherein generating the causation score for each pod comprises correlating pod scheduling events on a node with failure events for the node.

7. A computer program product comprising a computer readable storage medium having stored thereon: program instructions programmed to obtain data indicative of a node failure; program instructions programmed to obtain data associated with nodes and pods started on each node; program instructions programmed to generate a causation score for each pod associated with a failed node, wherein each pod associated with the failed node is designated as a candidate pod for the node failure; program instructions programmed to determine pod rescheduling for each candidate pod associated with the failed node based, at least in part, on a pod ranking of the causation score for each pod; program instructions programmed to spread each candidate pod among a plurality of available nodes for rescheduling based on a policy; and program instructions programmed to provide the pod rescheduling to a node cluster to restart each pod associated with the failed node.

8. The computer program product of claim 7, the computer readable storage medium having further stored thereon:
program instructions programmed to identify a pod priority for each pod on each node; and
program instructions programmed to bias rescheduling of candidate pods to place the candidate pods on nodes with pods having lower pod priorities.

9. The computer program product of claim 7, the computer readable storage medium having further stored thereon:
program instructions programmed to obtain data indicative of additional node failure, wherein one of the candidate pods was started on the failed node;
program instructions programmed to determine the causation score for the one of the candidate pods exceeds a defined threshold, wherein the one of the candidate pods is promoted to a primary candidate pod based on exceeding the defined threshold;
program instructions programmed to generate notification data indicative of the primary candidate pod; and
program instructions programmed to provide the notification data to identify the primary candidate pod for analysis.

10. The computer program product of claim 9, the computer readable storage medium having further stored thereon:
program instructions programmed to assign the primary candidate pod to an isolated node.

11. The computer program product of claim 9, wherein the notification data indicating the primary candidate pod includes a harmfulness confidence level of the primary candidate pod.

12. The computer program product of claim 7, wherein generating the causation score for each pod comprises correlating pod scheduling events on a node with failure events for the node.

13. A computer system comprising: a processor set; and a computer readable storage medium; wherein: the processor set is structured, located, connected, and programmed to run program instructions stored on the computer readable storage medium; and the stored program instructions include: program instructions programmed to obtain data indicative of a node failure; program instructions programmed to obtain data associated with nodes and pods started on each node; program instructions programmed to generate a causation score for each pod associated with a failed node, wherein each pod associated with the failed node is designated as a candidate pod for the node failure; program instructions programmed to determine pod rescheduling for each candidate pod associated with the failed node based, at least in part, on a pod ranking of the causation score for each pod; program instructions programmed to spread each candidate pod among a plurality of available nodes for rescheduling based on a policy; and program instructions programmed to provide the pod rescheduling to a node cluster to restart each pod associated with the failed node.

14. The computer system of claim 13, wherein the stored program instructions further include:
program instructions programmed to identify a pod priority for each pod on each node; and
program instructions programmed to bias rescheduling of candidate pods to place the candidate pods on nodes with pods having lower pod priorities.

15. The computer system of claim 13, wherein the stored program instructions further include:
program instructions programmed to obtain data indicative of additional node failure, wherein one of the candidate pods was started on the failed node;

program instructions programmed to determine the causation score for the one of the candidate pods exceeds a defined threshold, wherein the one of the candidate pods is promoted to a primary candidate pod based on exceeding the defined threshold;

program instructions programmed to generate notification data indicative of the primary candidate pod; and program instructions programmed to provide the notification data to identify the primary candidate pod for analysis.

16. The computer system of claim 15, wherein the stored program instructions further include:

program instructions programmed to assign the primary candidate pod to an isolated node.

17. The computer system of claim 13, wherein generating the causation score for each pod comprises correlating pod scheduling events on a node with failure events for the node.

\* \* \* \* \*